United States Patent
Wiedemann et al.

(10) Patent No.: US 11,952,149 B2
(45) Date of Patent: Apr. 9, 2024

(54) SYSTEM AND METHOD OF FORECASTING AIRCRAFT ENGINE OPERATIONAL DATA FOR PREDICTIVE ANALYTICS

(71) Applicant: General Electric Company, Schenectady, NY (US)

(72) Inventors: Joshua Luke Wiedemann, Cincinnati, OH (US); Craig Miller Kuhne, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 17/023,763

(22) Filed: Sep. 17, 2020

(65) Prior Publication Data

US 2022/0081129 A1    Mar. 17, 2022

(51) Int. Cl.
*B64F 5/60* (2017.01)
*B60W 50/00* (2006.01)
(Continued)

(52) U.S. Cl.
CPC ........... *B64F 5/60* (2017.01); *B60W 50/0097* (2013.01); *B64D 45/00* (2013.01);
(Continued)

(58) Field of Classification Search
CPC ... B64F 5/60; G06N 7/01; G06N 7/08; G06N 5/04; G06N 5/046; B64D 2045/0085;
(Continued)

(56) References Cited

U.S. PATENT DOCUMENTS 7,286,923 B2   10/2007   Pomeroy et al.
7,328,128 B2    2/2008   Bonanni et al.
(Continued)

FOREIGN PATENT DOCUMENTS

CN    106201849 A    12/2016
CN    109472110 A     3/2019

OTHER PUBLICATIONS

Yu, Aircraft engine health prognostics based on logistic regression with penalization regularization and state-space-based degradation framework, 2017, Aerospace Science and Technology 68, pp. 345-361 (Year: 2017).*

*Primary Examiner* — Russell Frejd
*Assistant Examiner* — Sara J Lewandroski
(74) *Attorney, Agent, or Firm* — Dority & Manning, P.A.

(57) ABSTRACT

Systems and methods for forecasting aircraft engine operational data are provided. The forecasted data can be used for use with predictive analytics, for example. In one aspect, a method is provided. The method includes receiving engine data associated with an engine. The engine data includes data points for various operational parameters. The method further includes determining forecasted data points for the operational parameters. The forecasted data points for a given one of the operational parameters are determined by applying one or more regression techniques to the data points associated with the given one of the operational parameters. The forecasted data points can be input into various types of models, such as a cumulative damage model. For instance, using the forecasted data points, a cumulative damage model can generate a plurality of forecasts and can output a cumulative probability distribution.

20 Claims, 11 Drawing Sheets

(51) Int. Cl.

| | |
|---|---|
| *B64D 45/00* | (2006.01) |
| *G05B 23/02* | (2006.01) |
| *G06N 7/00* | (2023.01) |
| *G06N 7/01* | (2023.01) |
| *G07C 5/00* | (2006.01) |
| *G06F 17/18* | (2006.01) |
| *G07C 5/08* | (2006.01) |

(52) U.S. Cl.
CPC .......... *G05B 23/0283* (2013.01); *G06N 7/01* (2023.01); *G07C 5/006* (2013.01); *B64D 2045/0085* (2013.01); *G05B 23/024* (2013.01); *G06F 17/18* (2013.01); *G07C 5/0808* (2013.01)

(58) Field of Classification Search
CPC .... G07C 5/006; G07C 5/0808; G07C 5/0816; G07C 5/0841; G05B 23/0283; G05B 23/0286; G05B 23/0294; G05B 23/024; B60W 50/0097; G06F 17/18
See application file for complete search history.

(56) References Cited

U.S. PATENT DOCUMENTS

| | | |
|---|---|---|
| 7,457,785 B1 | 11/2008 | Greitzer et al. |
| 7,548,830 B2 | 6/2009 | Goebel et al. |
| 8,600,917 B1 | 12/2013 | Schimert et al. |
| 8,868,287 B2 | 10/2014 | Delaye et al. |
| 10,042,964 B2 | 8/2018 | Kessie et al. |
| 10,229,369 B2 | 3/2019 | Ardis et al. |
| 10,336,472 B2 | 7/2019 | Nicks et al. |
| 10,417,843 B2 | 9/2019 | Pettre |
| 11,340,570 B2 * | 5/2022 | Chakrabarti ............ F03D 80/50 |
| 2003/0036891 A1 | 2/2003 | Aragones et al. |
| 2006/0235707 A1 | 10/2006 | Goldstein et al. |
| 2010/0082267 A1 | 4/2010 | Schimert et al. |
| 2016/0240017 A1 * | 8/2016 | Lacaille ............ G05B 23/0254 |

* cited by examiner

| OPERATING CYCLE | RESIDUALS - P1 | RESIDUALS - P2 | RESIDUALS - P3 | ... | RESIDUALS - PN |
|---|---|---|---|---|---|
| C1 | 82.5 | 0.6 | 1.9 | ... | 14.3 |
| C2 | -50.9 | -2.2 | -13.6 | ... | -150.1 |
| C3 | 163.9 | 4.5 | 3.8 | ... | 60.6 |
| C4 | -1.29 | -0.1 | -17.4 | ... | -100.2 |
| ... | ... | ... | ... | ... | ... |
| CM | -21.8 | -1.2 | -24.8 | ... | -61.7 |

FIG. 9

SYSTEM AND METHOD OF FORECASTING AIRCRAFT ENGINE OPERATIONAL DATA FOR PREDICTIVE ANALYTICS

FIELD

The present subject matter relates generally to a system and method of forecasting engine operational data, e.g., for use with predictive analytical models.

BACKGROUND

Conventionally, predictive analytical models have been limited in their ability to forecast future engine health or part condition for use in work scope optimization and proactive fleet management. Indeed, forecasts of future aircraft engine health have been completed in a manual, case-by-case basis. Forecasting an aviation engine's health typically involves some extrapolation of an engine's current damage accumulation. Particularly, engine data is input into a health model to determine the present damage accumulation or health associated with an engine. The present damage accumulation is then typically linearly extrapolated into the future. The extrapolated damage accumulation is then used to schedule service visits as well to manage a fleet of aviation engines. In some instances, extrapolation of the present damage accumulation can fail to account for correlations between parameters and the uncertainty of an aviation engine's behavior as it operates future operating cycles. Accordingly, the accuracy of such extrapolations are not always satisfactory.

Accordingly, systems and methods that address one or more of the challenges noted above would be useful.

BRIEF DESCRIPTION

Aspects of the present disclosure are directed to distributed control systems and methods of controlling turbomachines. Aspects and advantages of the invention will be set forth in part in the following description, or may be obvious from the description, or may be learned through practice of the invention.

In one aspect, a method is provided. The method includes receiving, by one or more computing devices, engine data associated with an engine, the engine data including data points for operational parameters, each of the data points being defined in part by a value associated with one of the operational parameters. The method also includes determining, by the one or more computing devices, forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters. Further, the method includes generating, by the one or more computing devices, a plurality of forecasts based at least in part on the forecasted data points, the plurality of forecasts each predicting a damage sum associated with the engine. Moreover, the method includes outputting, by the one or more computing devices, a cumulative probability distribution indicating a cumulative probability of the plurality of forecasts exceeding a predetermined threshold prior to a next scheduled service visit for the engine.

In another aspect, a method is provided. The method includes receiving, by one or more computing devices, engine data associated with an engine, the engine data including data points each defined in part by a value associated with an operational parameter. The method also includes determining, by the one or more computing devices, forecasted data points associated with the operational parameter, each of the forecasted data points being defined in part by a forecasted value associated with the operational parameter, and wherein a given one of the forecasted data points is determined by: generating, by the one or more computing devices, a preliminary regression line relative to the data points; filtering out, by the one or more computing devices, outlier data points from the data points to render filtered data points, the outlier data points being filtered out based at least in part on a position of a given data point of the data points relative to the preliminary regression line; generating, by the one or more computing devices, a final regression line relative to the filtered data points; generating, by the one or more computing devices, a set of coefficients for a forecasting function based at least in part on the final regression line; generating, by the one or more computing devices, a forecasted regression line based at least in part on the forecasting function and the set of coefficients; selecting, by the one or more computing devices, a residual from a residual table, the residual defining a distance between a data point of the data points and the preliminary regression line, and wherein the given one of the forecasted data points is determined, by the one or more computing devices, based at least in part on the residual selected from the residual table and the forecasted regression line.

In a further aspect, a system is provided. The system includes one or more memory devices and one or more processors. The one or more processors being configured to: receive data associated with an asset, the data including data points for operational parameters, each of the data points being defined in part by a value associated with one of the operational parameters; determine forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters; generate a plurality of forecasts based at least in part on the forecasted data points, the plurality of forecasts each predicting a damage sum associated with the asset; and output a cumulative probability distribution indicating a cumulative probability of the plurality of forecasts exceeding a predetermined threshold prior to a next scheduled service visit for the asset.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 provides an example table depicting residuals calculated for various operational parameters, including residuals associated with the first parameter;

DETAILED DESCRIPTION

Figure 1:
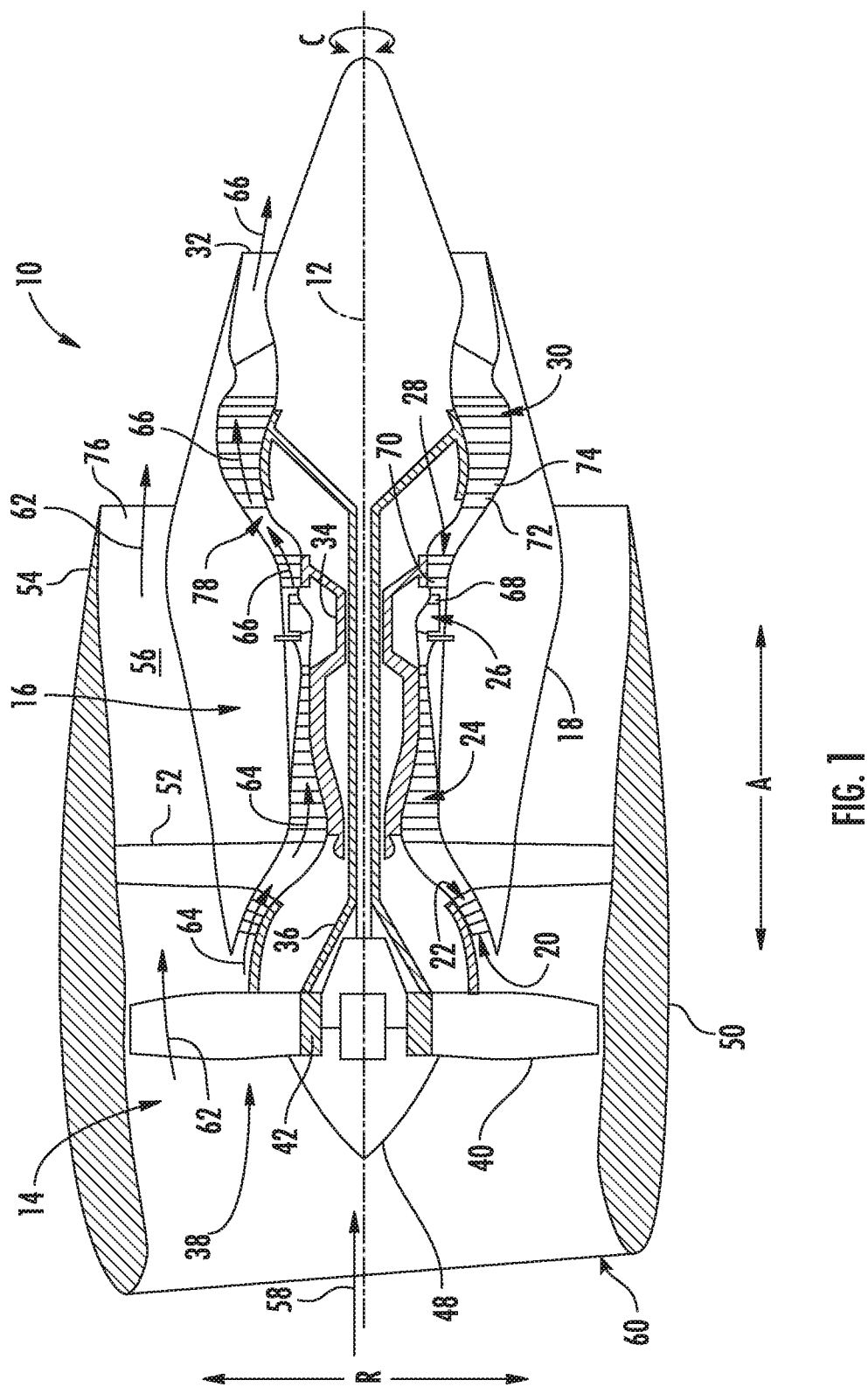
FIG. 1 provides a schematic cross-sectional view of an aviation gas turbine engine according to one example embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Aspects of the present disclosure are directed to systems and methods for forecasting aircraft engine operational data, e.g., for use with predictive analytics. In forecasting engine operational data with the systems and methods provided herein, route structure, seasonal variation, engine deterioration, and correlations between operational parameters can be taken into consideration. The engine operational data can be forecasted in a probabilistic manner in that an element of uncertainty is maintained in the forecasted data. The forecasted data can be input into various types of models, such as a cumulative damage model. The accuracy of the forecasted engine data can significantly improve the accuracy of such models.

In one aspect, one or more computing devices of a system can receive engine data associated with an engine. The engine can be an aviation gas turbine engine, for example. The engine data can include data points for various operational parameters. Each data point can be defined by an operating cycle of the engine and a value associated with one of the operational parameters. For instance, a given data point can be represented as (CN, PV), wherein PV is a sensed or calculated value for the operational parameter and CN is the operating cycle during which the parameter value PV was sensed or for which the parameter value PV was calculated based on one or more sensed values captured during that operating cycle.

The one or more computing devices can then determine forecasted data points for each of the operational parameters. For instance, forecasted data points can be determined for a first operational parameter, forecasted data points can be determined for a second operational parameter, forecasted data points can be determined for a third operational parameter, and so on. The forecasted data points for a given one of the operational parameters can be determined by applying one or more regression techniques to the data points associated with the given one of the operational parameters. Each forecasted data point can be defined by a future operating cycle of the engine and a predicted or forecasted value associated with one of the operational parameters. For instance, a given forecasted data point can be represented as (FR-CN, FR-PV), wherein FR-PV is a forecasted value for the operational parameter and FR-CN is the future operating cycle for which the predicted parameter value FR-PV is calculated.

Determining the forecasted data points for a given one of the operational parameters can include generating a preliminary regression line by applying the one or more regression techniques to the data points associated with the given one of the operational parameters. Outlier data points from the data points associated with the given one of the operational parameters can be filtered out and no longer considered. In this manner, filtered data points are rendered. The outlier data points can be filtered out based at least in part on a position of a given data point of the data points associated with the given one of the operational parameters relative to the preliminary regression line. Filtering out data points facilitates generation of a more accurate final regression line, which in turn facilitates generation of a more accurate forecasted regression line. The process of generating a preliminary regression line and filtering out data points can be repeated as necessary until there is a level of confidence that the filtered data points represent dominant behavior of the engine.

A residual table can be generated. The residual table can include a plurality of residuals generated for each of the operational parameters. Each residual in the residual table is associated with a given one of the operational parameters and one of the operating cycles of the engine. A given residual in the table can be generated or determined as the vertical distance between a given data point associated with one of the operational parameters and the preliminary regression line associated that operational parameter. The residuals in the residual table can be generated for all data points, including data points that are eventually filtered out. In this manner, the uncertainty in the initial data points are carried forward to the forecasted data points.

A final regression line can be generated by applying the one or more regression techniques to the filtered data points. The final regression line is final in that it is the regression line that is used to generate a set of coefficients. Particularly, a set of coefficients can be generated and implemented or incorporated into a forecasting function associated with the given one of the operational parameters based at least in part on the final regression line. The set of coefficients can include a parameter baseline coefficient, a deterioration coefficient, a seasonal variation coefficient, and/or a seasonal peak offset coefficient. The deterioration coefficient indicates a slope of a deterioration line that trends with or best fits the final regression line. The seasonal variation coefficient indicates an amplitude of the final regression line. The parameter baseline coefficient represents the y-intercept or point along the y-axis where the final regression line intercepts a preselected operating cycle of the engine. The seasonal peak offset coefficient can be determined as a frequency of the final regression line.

A forecasted regression line is generated based at least in part on the forecasting function and the set of coefficients. Particularly, the forecasted regression line is forecasted into the future for future operating cycles. The determined coefficients are input into the forecasting function as well as a value for a given future operating cycle to ultimately determine the y-value for the forecasted regression line at the given future operating cycle.

A given one of the forecasted data points for a given one of the operational parameters can be generated for a future operating cycle based at least in part on a selected residual associated with the given operational parameter and the forecasted regression line. Particularly, a residual associated with the operational parameter can be selected from the residual table. The residual can be randomly selected from the residuals associated with the given operational parameter. The forecasted data point at the future operating cycle can be generated at a location or (x, y) coordinate using the selected residual. The x-value is the value of the future operating cycle, e.g., 16,500. The y-value is determined by starting at a point along the forecasted regression line that corresponds with the future operating cycle value and then moving vertically up or down depending on whether the residual is positive or negative. The vertical distance moved corresponds with the absolute value of the residual. Accordingly, the y-value of the forecasted data point corresponds to the forecasted regression line plus or minus the value of the selected residual.

Forecasted data points can be generated for each desired operational parameter. It will be appreciated that the same process described above can be used to generate forecasted data points for other operational parameters. Notably, in determining the forecasted data points for the operational parameters, the residuals used to generate the forecasted data points for each of the operational parameters for a given future operating cycle are all selected to correspond to residuals associated with or derived from a same operating cycle of the engine. In this way, the forecasted data points for the operational parameters are generated in a coordinated manner and the correlations or relationships between the operational parameters are maintained.

With the forecasted data points generated for the various operational parameters, the forecasted data points can be input into a cumulative damage model. The cumulative damage model can generate a plurality of forecasts based at least in part on the forecasted data points. The plurality of forecasts can each predict a damage sum associated with the engine as a function of operating cycle or some other parameter, such as time. The cumulative damage model can output a cumulative probability distribution. The cumulative probability distribution can indicate a cumulative probability of the plurality of forecasts exceeding a predetermined threshold prior to a next scheduled service visit for the engine. The cumulative probability distribution can provide more granularity into the health status of an engine or one or more components thereof, e.g., compared to conventional methods. A cumulative probability distribution can be generated with high precision due to the accuracy of the forecasted data points input into the cumulative damage model. Various example embodiments are provided below to further teach the inventive aspects of the present subject matter.

FIG. 1 provides a schematic cross-sectional view of an aviation gas turbine engine according to one example embodiment of the present subject matter. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends along the axial direction A for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a core gas turbine engine 14 and a fan section 16 positioned upstream thereof. The core engine 14 includes a tubular outer casing 18 that defines an annular core inlet 20. The outer casing 18 further encloses and supports a booster or low pressure compressor 22 for pressurizing the air that enters the core engine 14 through core inlet 20. A high pressure, multi-stage, axial-flow compressor 24 receives pressurized air from the LP compressor 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 downstream to a high pressure turbine 28 for driving the high pressure compressor 24 through a high pressure spool 30 or a second rotatable component. The high energy combustion products then flow to a low pressure turbine 32 for driving the LP compressor 22 and the fan section 16 through a low pressure spool 34 or a first rotatable component. The LP spool 34 is coaxial with the HP spool 30 in this example embodiment. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by an annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. A downstream section 46 of the fan casing 40 extends over an outer portion of the core engine 14 to define a bypass passage 48. Air that passes through the bypass passage 48 provides propulsive thrust as will be explained further below. In some alternative embodiments, the LP spool 34 may be connected to the fan rotor 38 via a speed reduction device, such as a reduction gear gearbox in an indirect-drive or geared-drive configuration. Such speed reduction devices can be included between any suitable shafts/spools within the turbofan 10 as desired or required.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the LP compressor 22 through the core inlet 20.

The pressure of the second airflow 56 is progressively increased by the LP compressor 22 and then by the HP compressor 24, as represented by arrow 58. The discharged pressurized air stream flows downstream to the combustor 26 where fuel is introduced to generate combustion gases or products. The combustion products 60 exit the combustor 26 and flow through the HP turbine 28. The combustion products 60 then flow through the LP turbine 32 and exit the exhaust nozzle 36 to produce thrust. Moreover, as noted above, a portion of the incoming airflow 50 flows through the bypass passage 48 and through an exit nozzle defined between the fan casing 40 and the outer casing 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction A toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the HP turbine 28. For this embodiment, the HP turbine 28 rotates the HP compressor 24 via the HP spool 30 and the LP turbine 32 drives the LP compressor 22 and the fan rotor 38 via the LP spool 34.

Although turbofan 10 has been described and illustrated in FIG. 1 as representing an example gas turbine engine, the subject matter of the present disclosure may apply to other suitable types of engines and turbomachines. For instance, the subject matter of the present disclosure may apply to or be incorporated with other suitable turbine engines, such as steam and other gas turbine engines. Example gas turbine engines may include, without limitation, turbojets, turboprop, turboshaft, aeroderivatives, auxiliary power units, etc.

Figure 2:
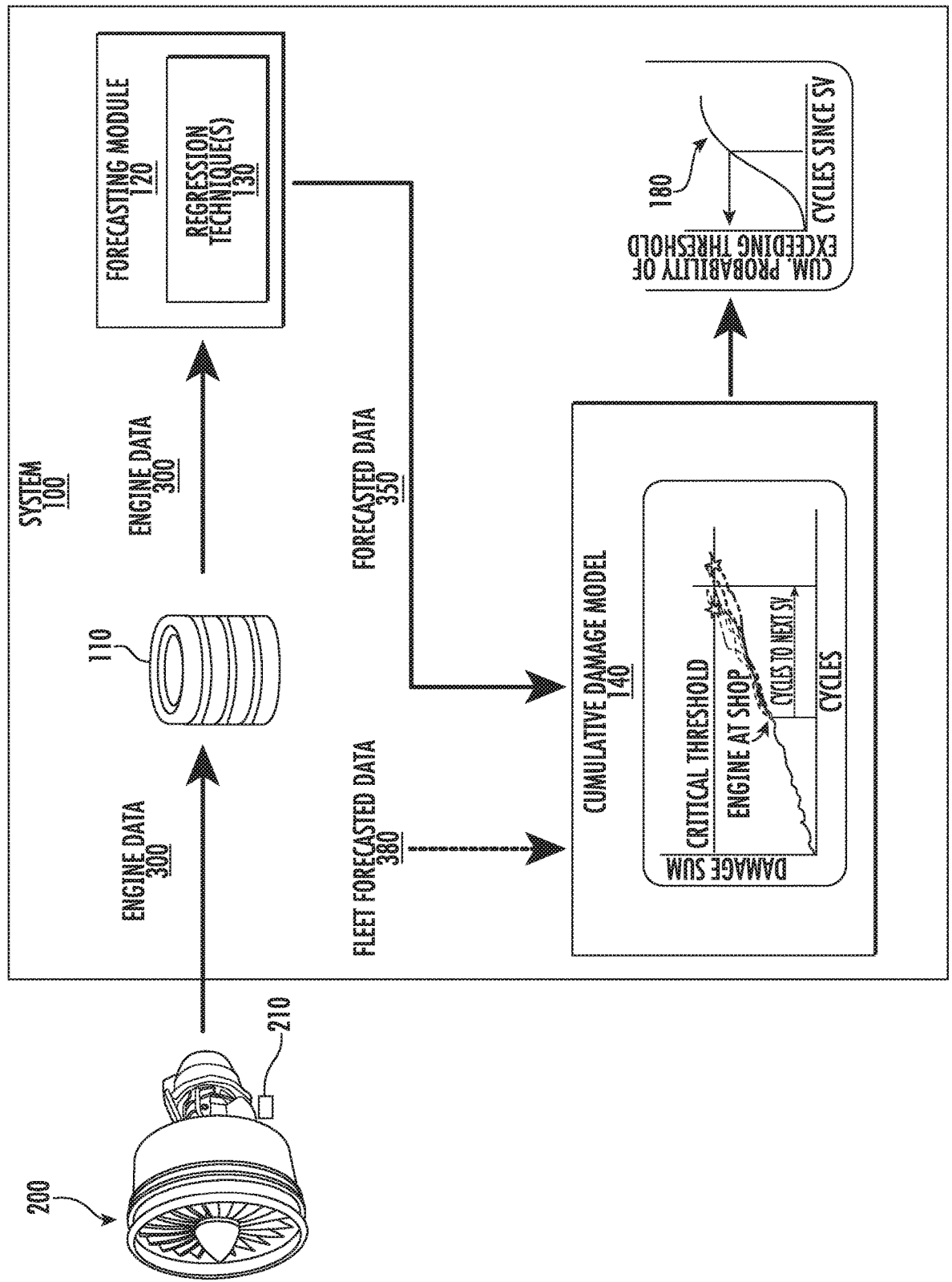
FIG. 2 provides a block diagram of a system according to one example embodiment of the present subject matter.
Figure 13:
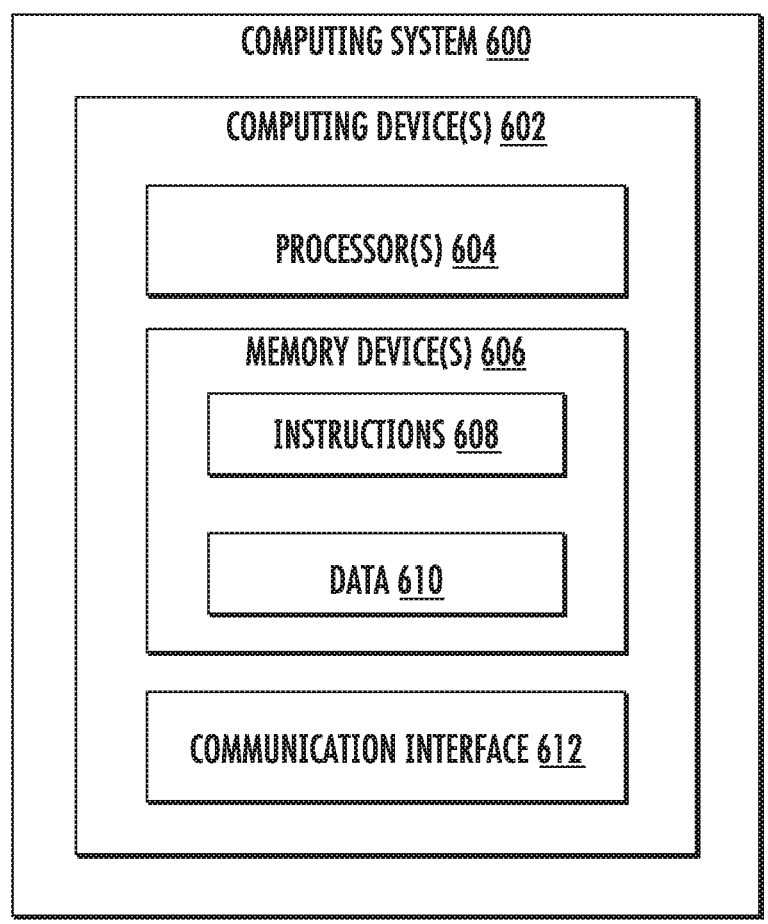
FIG. 13 provides a schematic view of a computing system for implementing one or more aspects of the present disclosure according to example embodiments of the present subject matter.

FIG. 2 provides a block diagram of a system 100 according to one example embodiment of the present subject matter. The system 100 can be a computing system having one or more processors and one or more memory devices. The one or more processors and one or more memory devices can be embodied on one or more computing devices and/or dedicated storage devices. The one or more memory devices can store information accessible by the one or more processors, including computer-readable instructions that can be executed by the one or more processors. The instructions can be any set of instructions that, when executed by the one or more processors, cause the one or more processors to perform operations, such as any of the method actions or operations described herein. The system 100 can be configured as shown in FIG. 13 and described in the accompanying text.

Generally, the system 100 is operable to forecast values for operational parameters associated with an engine 200 and to generate cumulative probability distributions, e.g., for use with predictive analytics, such as for shop visit work optimization. The engine 200 of FIG. 2 can be any suitable engine, such as the turbofan 10 of FIG. 1. It will be appreciated that the system 100 can be used for forecasting and predictive analysis of other assets or engines, including other types of aviation gas turbine engines or engines generally.

As depicted in FIG. 2, the engine 200 can include one or more associated sensors 210 for measuring or sensing the operating conditions of the engine 200, e.g., during operation of the engine 200. Particularly, the sensors 210 can measure or sense values for one or more parameters indicative of the operating conditions of the engine 200. Example parameters that may be recorded for a gas turbine engine include, without limitation, the low pressure spool speed N1, the high pressure or core spool speed N2, the compressor inlet pressure and temperature P2, T2, respectively, the compressor discharge pressure P3, and/or the temperature at the inlet or outlet of the combustor, T3 and T45, respectively. Other example parameters may include the altitude, air speed, ambient temperature, weather conditions, etc. Values for other parameters can be sensed as well.

The sensed values for the operational parameters can be recorded and stored, e.g., on one or more recorders or memory devices onboard an aircraft to which the engine 200 is mounted. For instance, one or more snapshots of data can be captured at various timepoints during operation of the engine 200. The snapshots, which each contain values for operational parameters at a given timepoint during an operation cycle of the engine 200, can be recorded and stored. The stored engine data 300 can then be transmitted, routed, or otherwise sent to the system 100.

Figure 3:
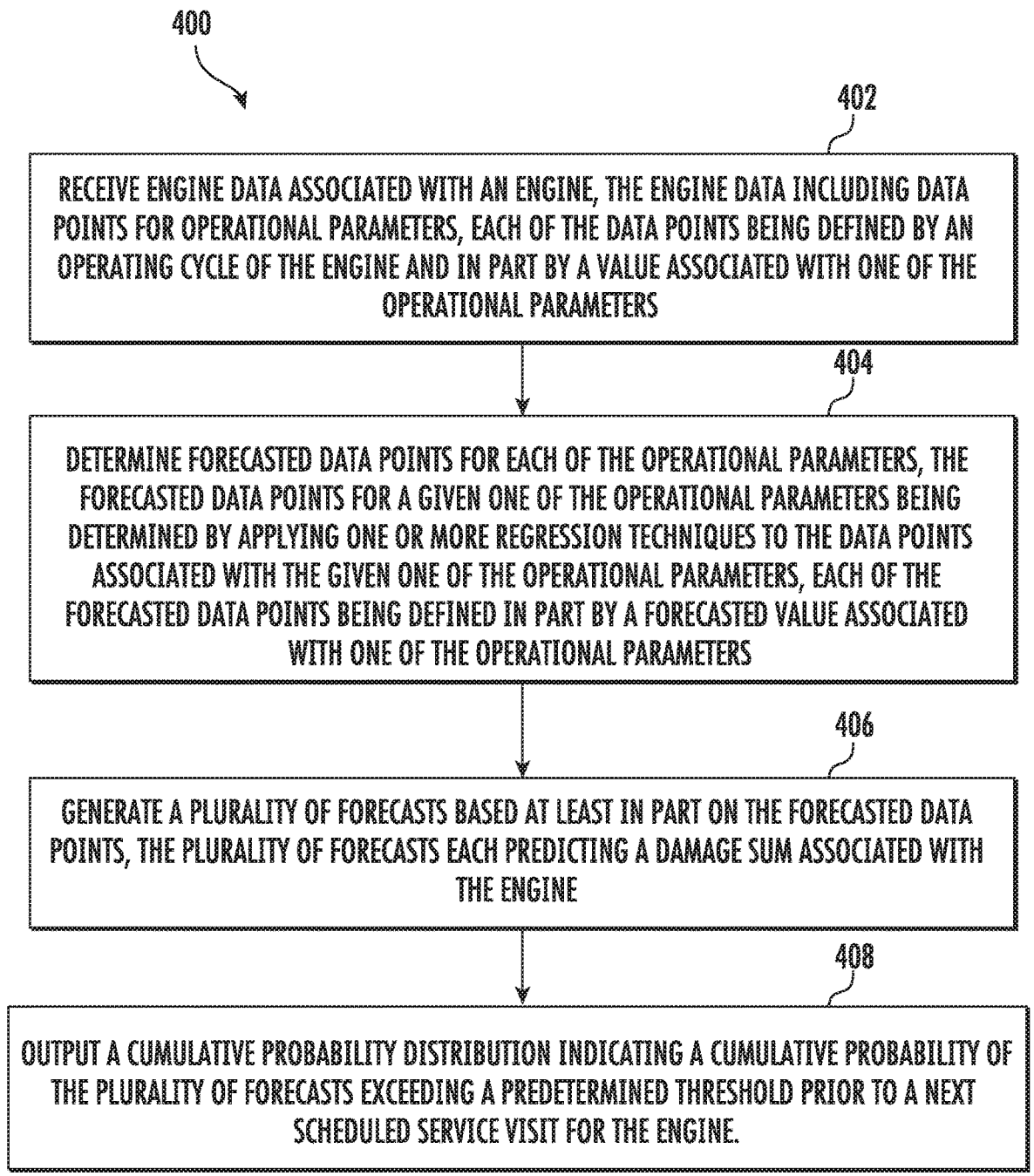
FIG. 3 provides a flow diagram of an example method according to one example embodiment of the present subject matter.

FIG. 3 provides a flow diagram of an example method (400) of determining forecasted values or data points for operational parameters and then using the forecasted data points to output a cumulative probability distribution. The system 100 can be used to implement method (400). It will be appreciated that actions of exemplary method (400) can be modified, adapted, expanded, rearranged and/or omitted in various ways without deviating from the scope of the present subject matter.

At (402), the method (400) includes receiving, by one or more computing devices of a system, engine data associated with an engine. For instance, as shown in in FIG. 2, the system 100 can receive the engine data 300. The received engine data 300 can be stored in a data store 110 or other memory device(s) of the system 100. As will be explained in detail below, the engine data 300 can include data points for various operational parameters. Each data point can be defined by an operating cycle of the engine 200 and a value associated with one of the operational parameters.

Figure 4:
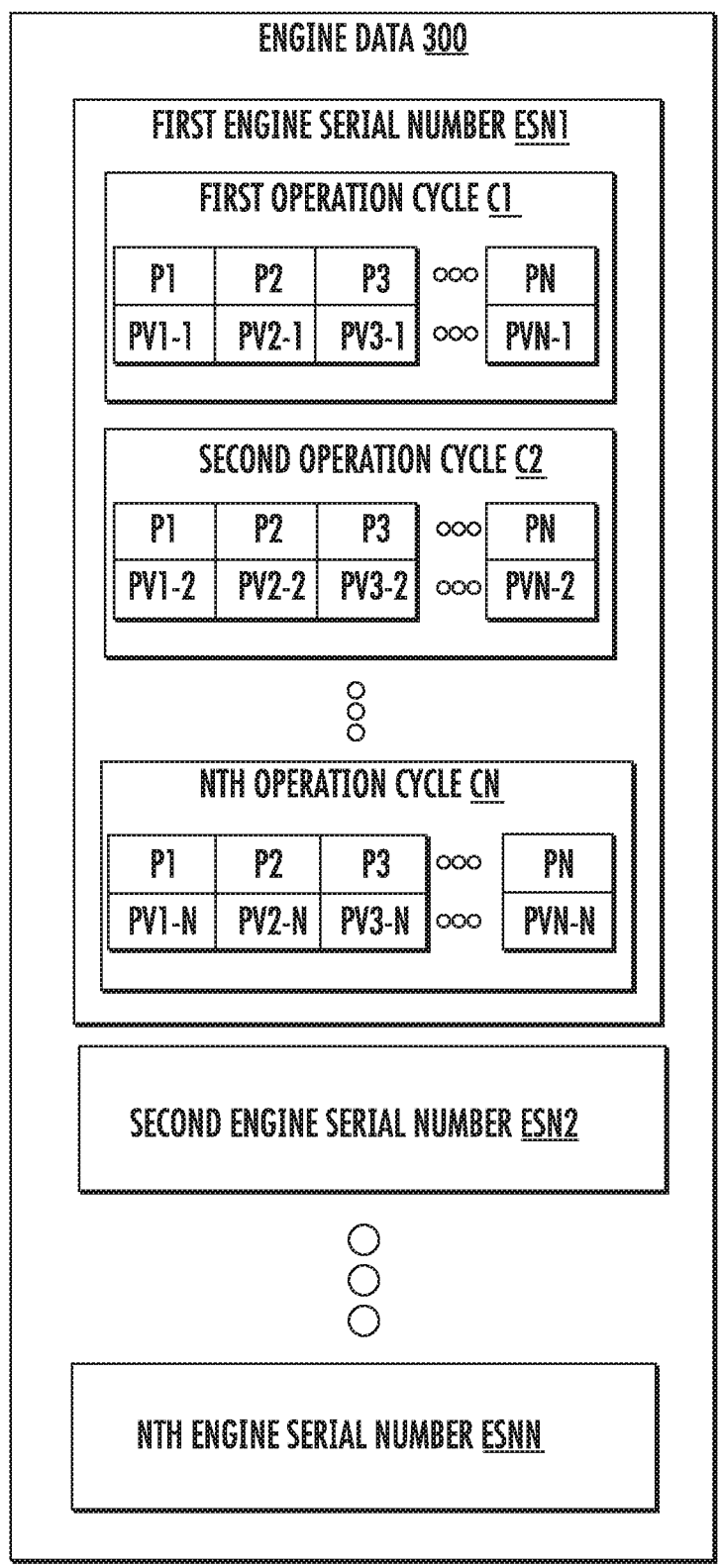
FIG. 4 provides a block diagram of example engine data that can be stored in a data store of the system of FIG. 2.

Engine data from various engines in a fleet can be stored and organized in the data store 110. Received engine data can be organized in the data store 110 by Engine Serial Number (ESN), for example, so that all data relevant to a particular engine can be readily accessed. By way of example, FIG. 4 provides a block diagram of engine data 300 that can be stored in the data store 110 of FIG. 2. As depicted, the engine data 300 is arranged by ESN. The engine data 300 can include data associated with a first engine serial number ESN1, a second engine serial number ESN2, and so on to an Nth engine serial number ESNN. As used herein, N can be any suitable integer. Each engine serial number ESN1, ESN2, ESNN includes data captured for various engine operating cycles (e.g., for various flights or missions). The first engine serial number ESN1 includes data for a first operating cycle C1, a second operating cycle C2, and so on to an Nth operating cycle.

The data captured during the operating cycles C1, C2, CN includes values for various parameters. For instance, the data captured during the first operating cycle C1 includes parameter values PV1-1, PV2-1, PV3-1, PVN-1 that correspond to a first parameter P1, a second parameter P2, a third parameter P3, and an Nth parameter, respectively. Likewise, the data captured during the second operating cycle C2 includes parameter values PV1-2, PV2-2, PV3-2, PVN-2 that correspond to the first, second, third, and Nth parameters P1, P2, P3, PN, respectively. Further, the data captured during the Nth operating cycle includes parameter values PV1-N, PV2-N, PV3-N, PVN-N that correspond to the first, second, third, and Nth parameters P1, P2, P3, PN, respectively. The data captured for each operating cycle or "snapshot" is captured at a given timepoint during an operating cycle of the engine. In some embodiments, the snapshots of data can be captured based upon a trigger condition. For instance, a snapshot of data can be captured when the aircraft to which the engine 200 is mounted reaches a predetermined altitude or a predetermined time into the flight.

In some embodiments, the system 100 can access and determine one or more values for additional parameters associated with the engine 200 using the sensed or raw values captured by the one or more sensors 210 of the engine 200. By way of example, as noted, the engine data can include sensed values for various parameters, such as pressures and temperatures at different stations of the engine, ambient temperature, shaft spool speed, etc. The sensed values for these parameters can be utilized to calculate or determine values for other parameters associated with the engine 200. For example, values for parameters such as exhaust gas temperature (EGT), engine pressure ratios, stall margin, various mass flows, various efficiencies, etc. can be determined based at least in part on the sensed values. The calculated values for the parameters can be added to or otherwise included in the engine data 300.

As noted above, the engine data 300 can contain values for a plurality of operational parameters. The values can be sensed and/or calculated values. The sensed and/or calculated values can be embodied as data points. Particularly, each data point can be defined by a value for a given operational parameter and an operating cycle of the engine. For instance, with reference to FIG. 4, the first parameter value PV1-1 associated with the first operational parameter P1 captured during the first operating cycle C1 can be defined as data point (C1, PV1-1). The first parameter value PV1-1 associated with the first operational parameter P1 captured during the second operating cycle C2 can be defined as data point (C2, PV1-2). The first parameter value PV1-1 associated with the first operational parameter P1 captured during the Nth operating cycle CN can be defined as data point (CN, PV1-N). Accordingly, each data point has an engine operating cycle component and a sensed and/or calculated value component. The values for other operational parameters can be embodied as data points in a similar manner.

At (404), returning to FIG. 3, the method (400) includes determining, by the one or more computing devices, forecasted data points for each of the operational parameters, the forecasted data points for a given one of the operational parameters being determined by applying one or more regression techniques to the data points associated with the given one of the operational parameters. Particularly, as will be explained in greater detail below, the one or more processors of the system 100 can determine forecasted values for at least one of the plurality of operational parameters. Forecasted values can be determined for a given operational parameter using sensed and/or calculated values associated with the given operational parameter. In some embodiments, the one or more processors can determine forecasted values for a set of operational parameters, e.g., EGT, core speed, compressor discharge pressure, and compressor efficiency. The determined forecasted values can be embodied as forecasted data points. Particularly, each forecasted data point can be defined by a forecasted value for the operational parameter and a future operating cycle of the engine.

Moreover, as will be explained further below, the forecasted values or forecasted data points for a given one of the operational parameters can be generated by the one or more processors of the system 100 by applying one or more regression techniques to sensed and/or calculated values or data points associated with the given one of the operational parameters. As shown in FIG. 2, values or data points for select operational parameters received as part of the engine data 300 are input into a forecasting module 120 that applies one or more regression techniques 130 or models to ultimately determine forecasted values or forecasted data points for the selected operational parameters.

Figure 5:
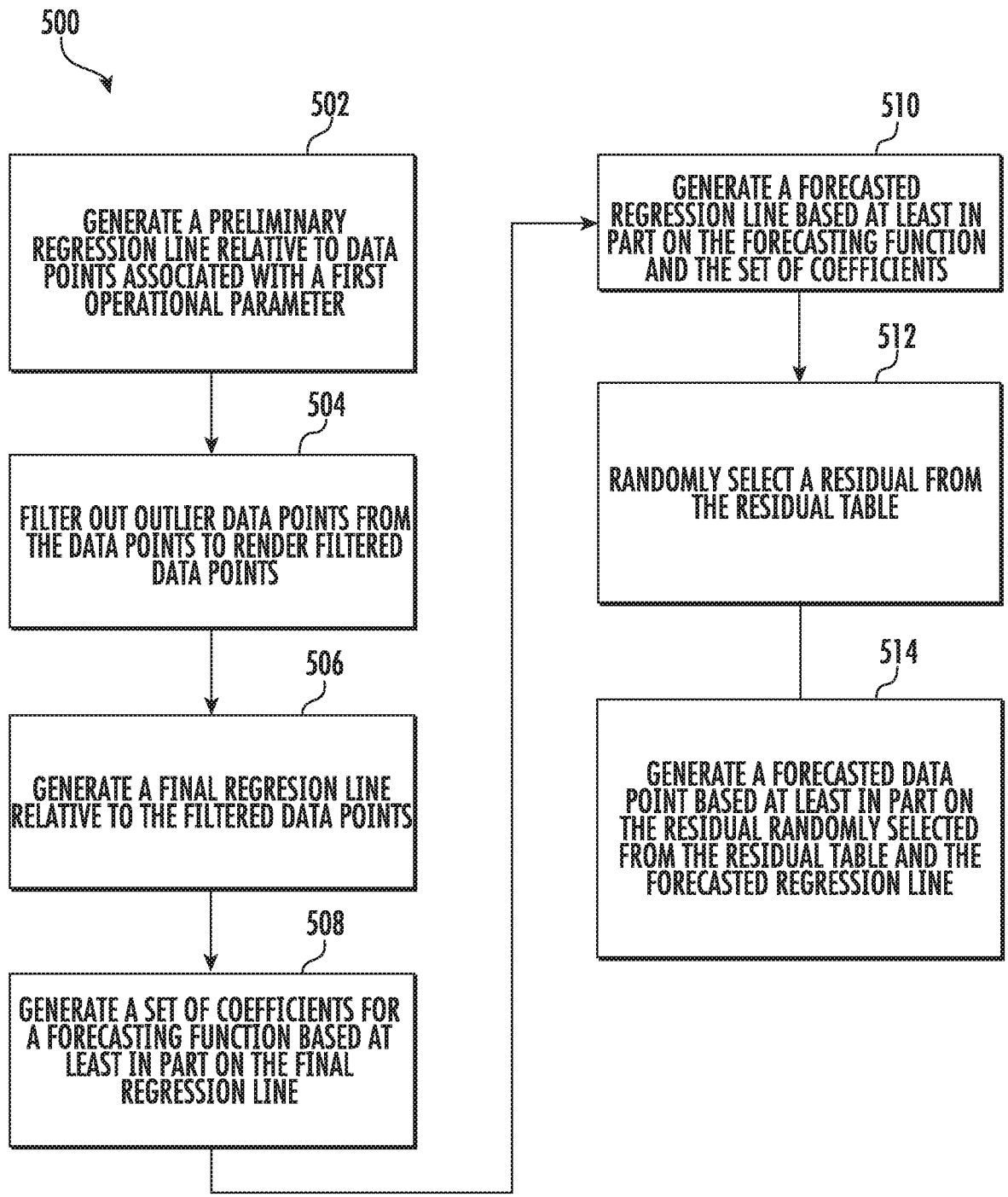
FIG. 5 provides a flow diagram of an example method in which the one or more processors of the system of FIG. 2 can determine forecasted values associated with a given operational parameter.

FIG. 5 provides a flow diagram of an example method (500) in which the one or more processors of the system 100 of FIG. 2, in executing the forecasting module 120, determine forecasted values or forecasted data points for various operational parameters. That is, FIG. 5 provides an example manner in which the system 100 can execute action (404) of method (400). As noted above, the determined forecasted values can be embodied as forecasted data points defined by a future engine operating cycle and a forecasted value for the operational parameter. To facilitate explanation, the method (500) will be explained in the context of determining forecasted values or forecasted data points for a first parameter P1. However, it will be appreciated that forecasted values or forecasted data points for any operational parameter can be determined using the method (500).

At (502), the method (500) includes generating, by one or more computing devices of the system 100, a preliminary regression line relative to the data points. Stated another way, a preliminary regression line can be generated for a given operational parameter by one or more processors of the system 100 by applying the one or more regression techniques to the data points associated with the given operational parameter. As noted above, each data point can be defined by an operating cycle of the engine and a value for a given operational parameter. The data points are received as part of the engine data 300 (FIG. 4). Any suitable regression technique or techniques can be used to generate the preliminary regression line relative to the data points. One or more linear regression and/or non-linear regression techniques can be utilized to generate the preliminary regression line relative to the data points.

Figure 6:
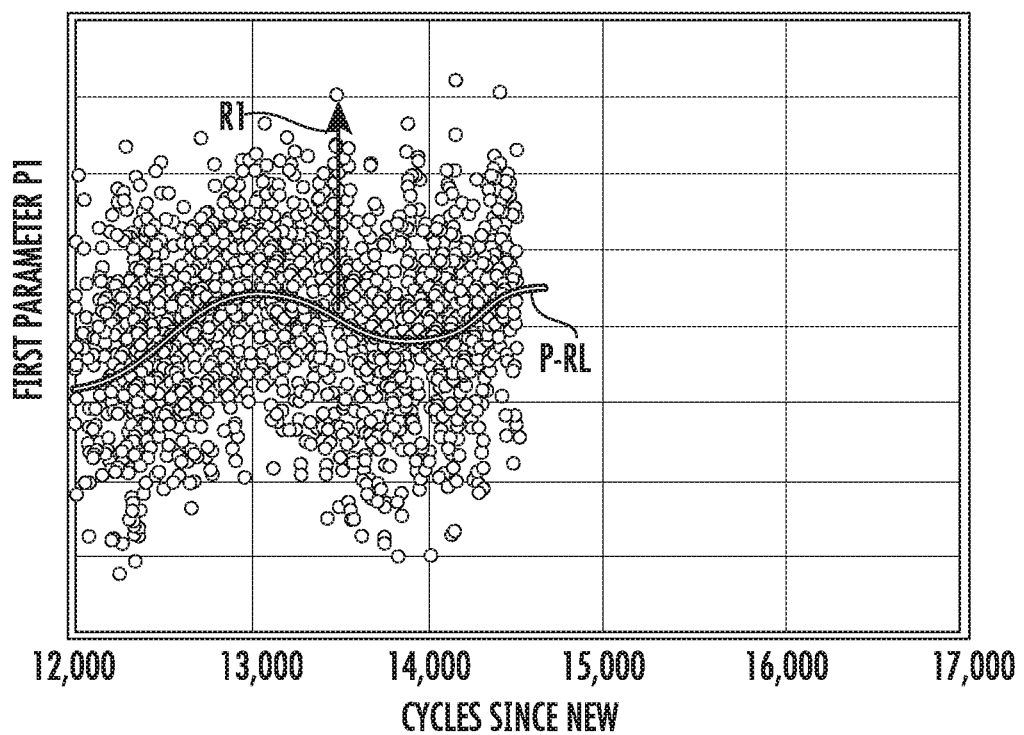
FIG. 6 provides a graph depicting data points associated with a first operational parameter and depicts a preliminary regression line generated relative to the data points.

By way of example, FIG. 6 provides a graph depicting data points associated with a first operational parameter P1. The first operational parameter P1 can be any suitable operational parameter, such as EGT, compressor efficiency, core spool speed, etc. Each data point represents a value for the first operational parameter P1 as a function of engine operating cycle. As depicted, one or more computing devices of the system 100 can generate a preliminary regression line P-RL relative to the data points.

At (504), the method (500) includes filtering out, by the one or more computing devices of the system 100, outlier data points from the data points to render filtered data points based at least in part on a position of a given data point of the data points relative to the preliminary regression line. For instance, data points that deviate from the preliminary regression line by a predetermined distance can be identified as outliers and filtered out or no longer considered. The data points are considered relative to the preliminary regression line by comparing a data point for a given operating cycle relative to a point along the preliminary regression line that corresponds with the given operating cycle.

Figure 7:
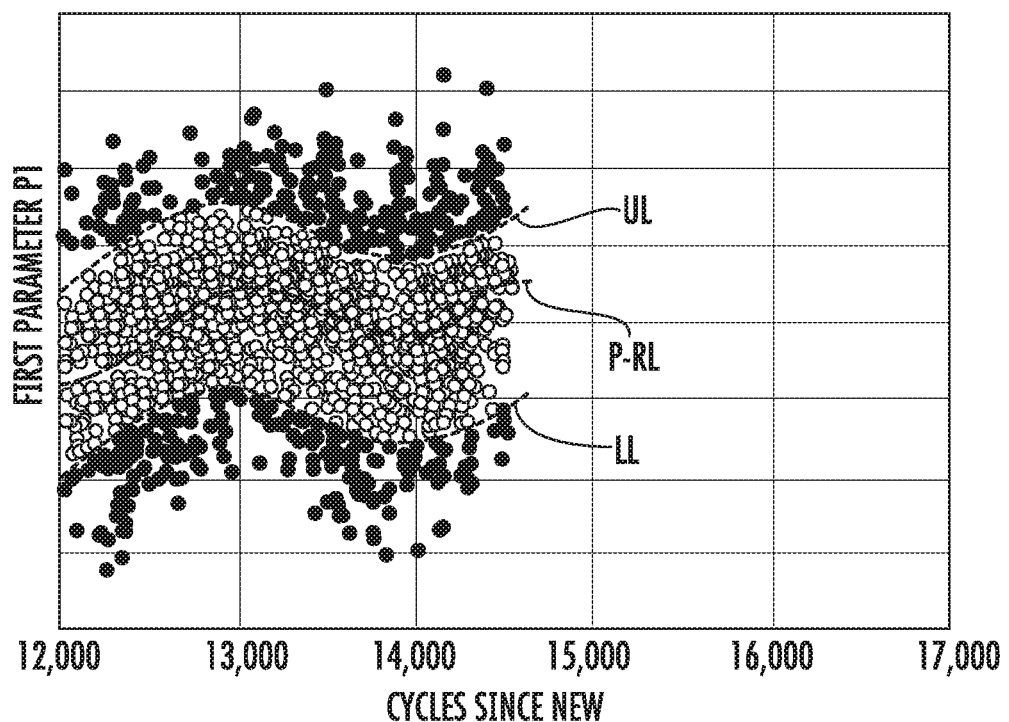
FIG. 7 provides a graph depicting some of the data points associated with the first operational parameter being filtered out relative to the preliminary regression line.

Continuing with the example, FIG. 7 provides a graph depicting some data points associated with the first operational parameter P1 being filtered out relative to the preliminary regression line P-RL. As shown, the one or more computing devices of the system 100 filter out data points that exceed or are above an upper limit UL as well as data points that exceed or are below a lower limit LL. The upper and lower limits UL, LL are set in accordance with a predetermined distance. The data points above the upper limit UL and below the lower limit LL are identified as outliers and filtered out. The resultant data points can be denoted as filtered data points. Filtering out data points facilitates generation of a more accurate final regression line, which in turn facilitates generation of a forecasted regression line as will be explained further below.

In some implementations, (502) and (504) can be performed iteratively until there is a level of confidence that the filtered data points represent dominant behavior of the engine. Stated another way, the one or more computing devices of the system 100 can generate a preliminary regression line relative to the data points and can filter out outlier data points based on the position of the respective data points relative to the preliminary regression line, thereby rendering a first set of filtered data points. Then, a second preliminary regression line can be generated relative to the data points of the first set and outlier data points can be filtered out from the filtered data points of the first set based on the position of the respective filtered data points of the first set relative to the second preliminary regression line, thereby rendering a second set of filtered data points. As noted, this process can be iterated until there is a level of confidence that the resultant filtered data points represent dominant behavior of the engine. The level of confidence can be set based on any suitable technique. For instance, the level of confidence can be based on a quantitative analysis. In such implementations, (502) and (504) can be iterated until the outlier data points are below a predetermined threshold.

Figure 8:
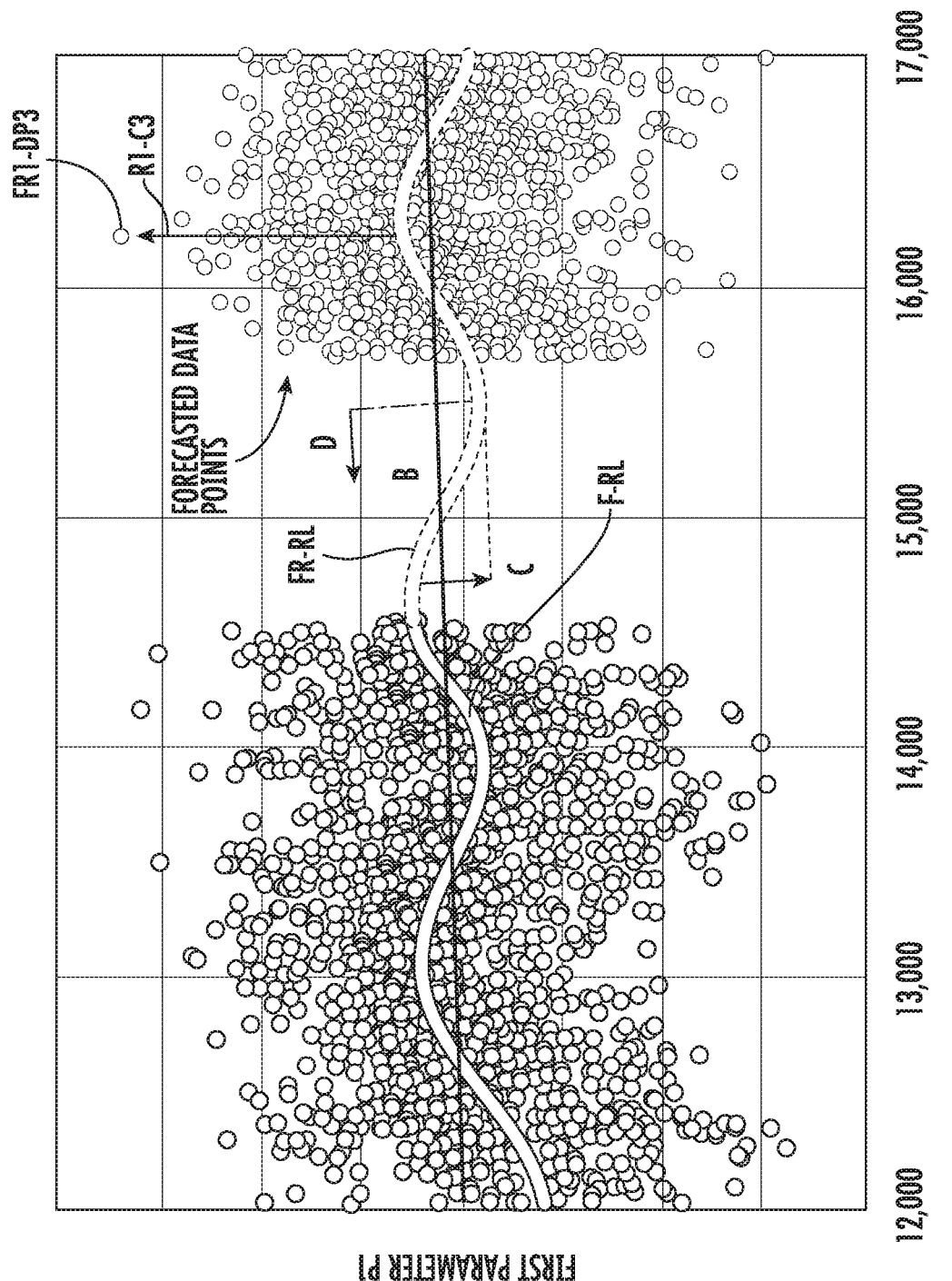
FIG. 8 provides a graph depicting a final regression line generated relative to filtered data points.

At (506), the method (500) includes generating, by the one or more computing devices of the system 100, a final regression line relative to the filtered data points. For instance, once there is a level of confidence that the filtered data points represent dominant behavior of the engine, a final regression line can be generated relative to the filtered data points. A final regression line can be generated for a given operational parameter by one or more processors of the system 100 by applying one or more regression techniques to the filtered data points. Any suitable regression technique or techniques can be used to generate the final regression line relative to the filtered data points. One or more linear regression and/or non-linear regression techniques can be utilized to generate the final regression line relative to the data points. Continuing with the example from above, FIG. 8 provides a graph depicting a final regression line F-RL generated relative to the filtered data points. The final regression line F-RL is a "final" regression line in that it is the regression line utilized to generate the set of coefficients at (508).

At (508), the method (500) includes generating, by the one or more computing devices, a set of coefficients for a forecasting function based at least in part on the final regression line. For instance, based at least in part on the final regression line, a set of coefficients can be generated, including without limitation, a parameter baseline coefficient, a deterioration coefficient, a seasonal variation coefficient, and a seasonal peak offset coefficient can be generated. The determined set of coefficients can be implemented into a forecasting function and used to generate a forecasted regression line as will be explained further below at (510).

An example forecasting function is defined below as Equation 1, wherein $f(CSN)$ denotes a value output by the forecasting function for a given operating cycle of the engine or "Cycle Since New", A is the parameter baseline coefficient, B is the deterioration coefficient, C is the seasonal variation coefficient, DOY denotes the day or date of the year, and D is the seasonal peak offset coefficient.

$$f(CSN) = A + B*CSN + C*\sin(DOY*2\pi/365 + D) \quad \text{(Equation 1)}$$

The parameter baseline coefficient A represents the y-intercept or point along the y-axis where the final regression line F-RL intercepts a preselected operating cycle of the engine. The deterioration coefficient B is fitted to the trend of the final regression line F-RL as shown in FIG. 8 (e.g., as a best fit line) and represents the deterioration of the engine as a function of operating cycles of the engine or a period of time. The seasonal variation coefficient C, as the name implies, represents the variation in the values associated with the first operational parameter P1 due to seasonal changes. The seasonal variation coefficient C can be determined as the amplitude of the final regression line F-RL. In some implementations, the greatest amplitude is selected as the seasonal variation coefficient C. In other implementations, the smallest amplitude is selected as the seasonal variation coefficient C. In yet other implementations, an average amplitude of the final regression line F-RL is selected as the seasonal variation coefficient C. The seasonal peak offset coefficient D is utilized to ensure the seasonal peaks are properly offset in the forecasted regression line. In this regard, the seasonal peak offset coefficient D can be determined as the frequency of the final regression line F-RL. In implementations in which the frequency of the final regression line F-RL is variable or not constant, an average frequency of the final regression line F-RL is selected as the seasonal peak offset coefficient D.

At (510), the method (500) includes generating, by the one or more computing devices, a forecasted regression line based at least in part on the forecasting function and the set of coefficients. For instance, the values for the coefficients can be input into the forecasting function (e.g., Equation 1) along with an operating cycle number and the day of the year to determine the y-value for the forecasted regression line. The x-value associated with a determined y-value is the operating cycle of the engine or cycle since new. The forecasted regression line can be forecasted out any suitable number of operating cycles. As shown in FIG. 8, a forecasted regression line FR-RL is generated based at least in part on the forecasting function and the determined set of coefficients. As noted above, the coefficients are determined based at least in part on the final regression line F-RL.

At (512), the method (500) includes selecting, by the one or more computing devices, a residual from a residual table. The residual defines a distance between a data point of the data points and the preliminary regression line. For instance, when the preliminary regression line is generated relative to the data points, e.g., at (502), a residual for each data point can be determined. In this manner, the method (500) can include generating, by the one or more computing devices, a residual table. The residual table includes a plurality of residuals associated with the first operational parameter as well as residuals associated with other operational parameters. The residuals can be stored in a table within one or more memory devices of the system 100. A residual can be randomly selected from the table, and as will be explained below, the residual can be used to generate a forecasted data point. More generally, the residuals associated with a given operational parameter can be used to generate forecasted data points associated with the given operational parameter.

As used herein, a residual is the vertical distance between a data point and a regression line, such as the preliminary regression line. For instance, as shown in FIG. 6, an example manner in which a residual is determined for one of the data points is shown. As depicted, the vertical distance between the preliminary regression line P-RL and the data point is determined as the residual R1 for that data point. Residuals can be determined for each data point, including data points that are eventually filtered out at (504). Data points above the preliminary regression line P-RL have positive residuals and data points below the preliminary regression line P-RL have negative residuals.

FIG. 9 provides an example table depicting residuals calculated for various operational parameters, including residuals associated with the first parameter P1. Each residual is arranged in the table by its associated parameter and operating cycle. In FIG. 9, the rows of the table represent the operating cycle associated with the residuals and the columns represent the parameter associated with the residuals. In other embodiments, the rows of the table can represent the operational parameter associated with the residuals and the columns represent the operating cycle associated with the residuals. The operating cycle associated with a given residual represents the operating cycle associated with the data point from which the residual is derived. For instance, if a residual is derived from a data point located at the 12,500 operating cycle, the operating cycle associated with the residual in the table would be operating cycle 12,500.

As depicted in FIG. 9, residuals for the data points associated with the first parameter P1 are calculated. The residuals can be calculated relative to the preliminary regression line P-RL of FIG. 6, for example. Particularly, for the first parameter P1, a residual of 82.5 was calculated for a data point associated with the first operating cycle C1, a residual of −50.9 was calculated for a data point associated with the second operating cycle C2, a residual of 163.9 was calculated for a data point associated with the third operating cycle C3, a residual of −1.29 was calculated for a data point associated with the fourth operating cycle C4, and a residual of −21.8 was calculated for a data point associated with the Nth operating cycle CN. Residuals for other operating parameters can be calculated as well. Specifically, residuals for a second parameter P2, a third parameter P2, a fourth parameter P4, and so on to the Nth parameter can be calculated and stored in the residual table.

At (514), the method (500) includes generating, by the one or more computing devices, a forecasted data point based at least in part on the residual randomly selected from the residual table and the forecasted regression line. For instance, a forecasted data point for the first parameter P1 can be determined, by the one or more computing devices of the system 100, based at least in part on the residual randomly selected from the residual table and the forecasted regression line.

Particularly, to generate a forecasted data point for the first operational parameter P1, a residual is randomly selected from the residual table. For instance, in FIG. 9, the residual randomly selected corresponds to the residual associated with the third operating cycle C3. Accordingly, the selected residual has a value of 163.9. To generate the forecasted point at a particular engine operating cycle, the forecasted point is generated at a position that is 163.9 units above the forecasted regression line. As shown in FIG. 8, the residual R1-C3, which has a value of 163.9 units, is used to generate a forecasted data point FR1-DP3 at the particular engine operating cycle, e.g., at operating cycle 16,300. The forecasted data point FR1-DP3 is thus 163.9 units vertically above the forecasted regression line FR-RL. To generate forecasted data points at other operating cycles, a residual is randomly selected from the residual table and the same process is followed.

Figure 10:
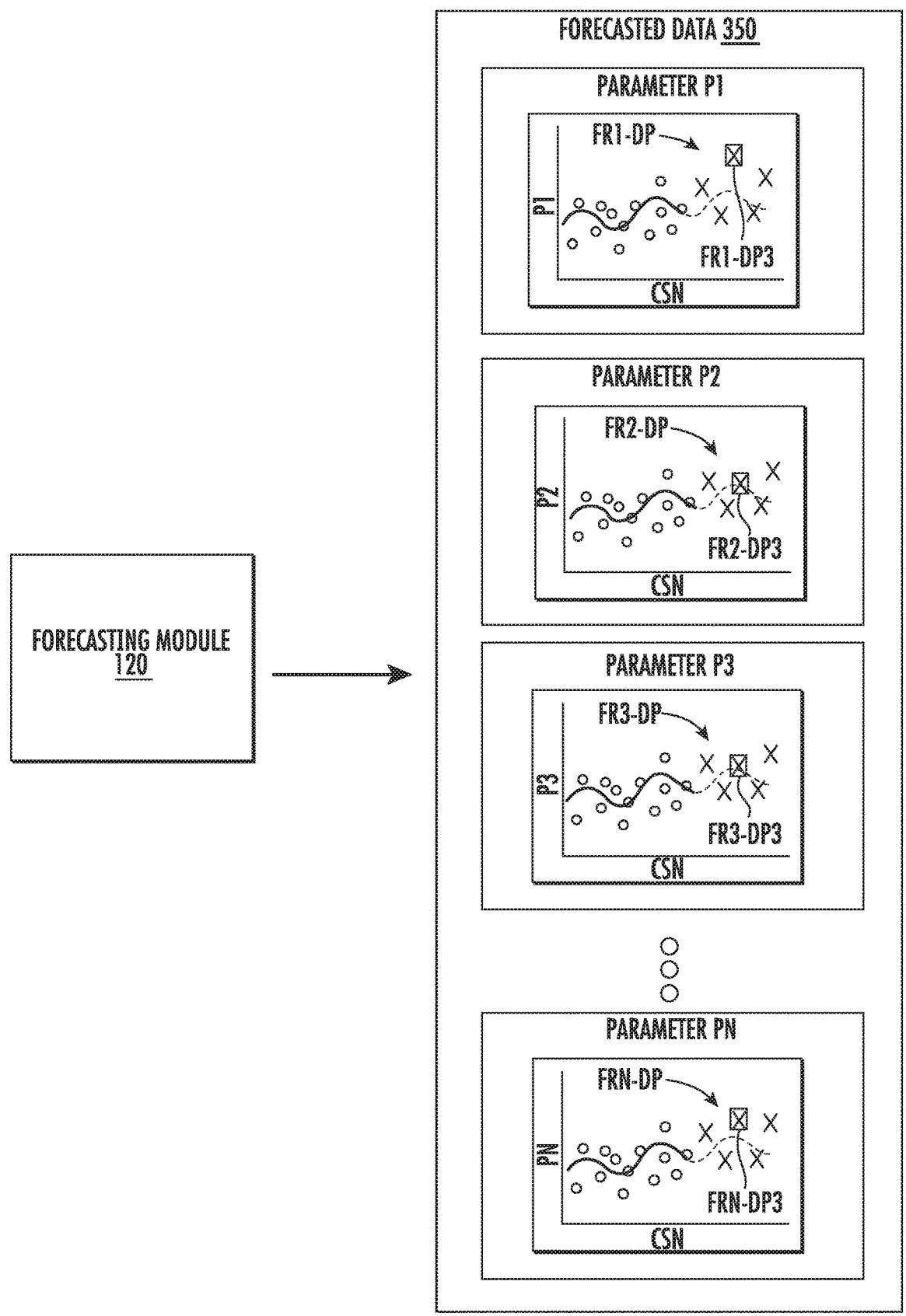
FIG. 10 provides a block diagram of example forecasted data generated by the system of FIG. 2.

In addition, this process can be followed to generate forecasted data points for all selected operational parameters. FIG. 10 provides a block diagram of forecasted data 350 generated by one or more processors of the system 100 upon execution of the forecasting module 120. As shown, the forecasted data 350 can include forecasted data points FR1-DP for the first parameter P1 (represented by X's), forecasted data points FR2-DP for the second parameter P2 (represented by X's), forecasted data points FR3-DP for the third parameter P3 (represented by X's), and forecasted data points FRN-DP for the Nth parameter PN (represented by X's). The forecasted values or forecasted data points for the operational parameters can be used for predictive analytics, e.g., to schedule shop visits for the engine.

Notably, the forecasted data points are generated in a coordinated manner that preserves the correlations or relationships between the operational parameters. Particularly, to generate forecasted data points for each operational parameter at a given future operating cycle, the residuals used to generate the forecasted data points for the operational parameters are all associated with or derived from data points of the same operating cycle.

By way of example, as shown in FIG. 10, the forecasted data points FR1-DP forecasted for the first operational parameter P1 include a forecasted data point FR1-DP3, the forecasted data points FR2-DP forecasted for the second operational parameter P2 include a forecasted data point FR2-DP3, the forecasted data points FR3-DP forecasted for the third operational parameter P3 include a forecasted data point FR3-DP3, and the forecasted data points FRN-DP forecasted for the Nth operational parameter PN include a forecasted data point FRN-DP3. The forecasted data points FR1-DP3, FR2-DP3, FR3-DP3, and FRN-DP3 all have been forecasted for the same future operating cycle, e.g., an operating cycle corresponding to the 16,300 cycle since new.

To generate the forecasted data points FR1-DP3, FR2-DP3, FR3-DP3, and FRN-DP3, e.g., for the operating cycle corresponding to the 16,300 cycle since new, residuals are selected from the residual table. Specifically, a set of residuals associated with an operating cycle is randomly selected and the residual that corresponds with a given operational parameter is used to generate the forecasted data point for the given operational parameter at the future operating cycle. For instance, the residual that corresponds to the first operational parameter P1 is selected from the randomly selected set of residuals associated with the operating cycle and is used to generate the forecasted data point FR1-DP3 at future operating cycle 16,300. Specifically, the selected residual that corresponds to the first operational parameter P1 is used as the y-value for the data point FR1-DP3 and the future operating cycle, e.g., 16,300, is used for the x-value for the data point FR1-DP3. The generated forecasted data point FR1-DP3 is added to the forecasted regression line associated with the first operational parameter P1. Further, the residual that corresponds to the second operational parameter P2 is selected from the randomly selected set of residuals associated with the operating cycle and is used to generate the forecasted data point FR2-DP3 at future operating cycle 16,300. Particularly, the selected residual that corresponds to the second operational parameter P2 is used as the y-value for the data point FR2-DP3 and the future operating cycle, e.g., 16,300, is used for the x-value for the data point FR2-DP3. The generated forecasted data point FR2-DP3 is added to the forecasted regression line associated with the second operational parameter P2.

In addition, the residual that corresponds to the third operational parameter P3 is selected from the randomly selected set of residuals associated with the operating cycle and is used to generate the forecasted data point FR3-DP3 at future operating cycle 16,300. Specifically, the selected residual that corresponds to the third operational parameter P3 is used as the y-value for the data point FR3-DP3 and the future operating cycle, e.g., 16,300, is used for the x-value for the data point FR3-DP3. The generated forecasted data point FR3-DP3 is added to the forecasted regression line associated with the third operational parameter P3. This process can be repeated up to the Nth operational parameter. The residual that corresponds to the Nth operational parameter PN is selected from the randomly selected set of residuals associated with the operating cycle and is used to generate the forecasted data point FRN-DP3 at future operating cycle 16,300. More specifically, the selected residual that corresponds to the Nth operational parameter PN is used as the y-value for the data point FRN-DP3 and the future operating cycle, e.g., 16,300, is used for the x-value for the data point FRN-DP3. The generated forecasted data point FRN-DP3 is added to the forecasted regression line associated with the Nth operational parameter PN.

To generate the forecasted data points for the next future operating cycle 16,301, the process iterates. Particularly, a set of residuals associated with an operating cycle is randomly selected and the residual within the randomly selected set that corresponds with a given operational parameter is used to generate the forecasted data point for the given operational parameter. Continuing with the example above, the residuals corresponding to another operating cycle, such as the first operating cycle C1 (FIG. 9), can be randomly selected for generation of forecasted data points, e.g., at future operating cycle 16,301. Accordingly, the residual that corresponds to the first operational parameter P1 is selected from the randomly selected set of residuals associated with the operating cycle (e.g., the first operating cycle C1) and is used to generate the forecasted data point at future operating cycle 16,301. Specifically, the selected residual that corresponds to the first operational parameter P1 is used as the y-value for the data point and the future operating cycle, e.g., 16,301, is used for the x-value for the forecasted data point.

Similarly, the residual that corresponds to the second operational parameter P2 is selected from the randomly selected set of residuals associated with the operating cycle (e.g., the first operating cycle C1) and is used to generate the forecasted data point at future operating cycle 16,301. Specifically, the selected residual that corresponds to the second operational parameter P2 is used as the y-value for the forecasted data point and the future operating cycle, e.g., 16,301, is used for the x-value for the forecasted data point. Residuals of the set of residuals corresponding to the operating cycle (e.g., the first operating cycle C1) can be used to generate forecasted data points for their corresponding operational parameters for future operating cycle 16,301 in the same manner as noted above. This process can be used to generate forecasted data points for the respective operational parameters for other future operating cycles. In this way, forecasted regression lines can be generated for a number of operational parameters, e.g., as shown in FIG. 10. In some embodiments, sets of residuals already randomly selected can be marked as "used" and removed from consideration for being randomly selected once again. In other embodiments, sets of residuals already randomly selected can be re-randomly selected.

By using the residuals associated with or derived from a same operating cycle of the engine to generate the forecasted data points for each operational parameter for a given future operating cycle, the correlations or relationships between the operational parameters can be preserved. Moreover, using residuals that are calculated from all the data points (even data points filtered out) maintains or carries the uncertainty in engine behavior into the forecasted data points. This makes the simulated or forecasted data points more realistic or representative of the actual data points that will be recorded for the future operating cycles.

At (406), returning to FIG. 3, the method (400) includes generating, by the one or more computing devices, a plurality of forecasts based at least in part on the forecasted data points. The plurality of forecasts can each predict a damage sum associated with the engine, e.g., as a function of operating cycle of the engine. For instance, as shown in FIG. 2, the forecasted data 350 generated by the forecasting module 120 is input into a cumulative damage module 140 of the system 100. Generally, the one or more processors of the system 100 can generate one or more forecasts based at least in part on the received forecasted data 350, and more specifically, on the forecasted data points received as part of the forecasted data 350. In some embodiments, in addition to the forecasted data 350 associated specifically with the engine 200, fleet forecasted data 380 can be generated by the forecasting module 120 and input into the cumulative damage module 140. The fleet forecasted data 380 can include forecasted data generated in the same manner noted above for other engines, such as engines that have been mounted to the same or similar tails as the engine 200.

Figure 11:
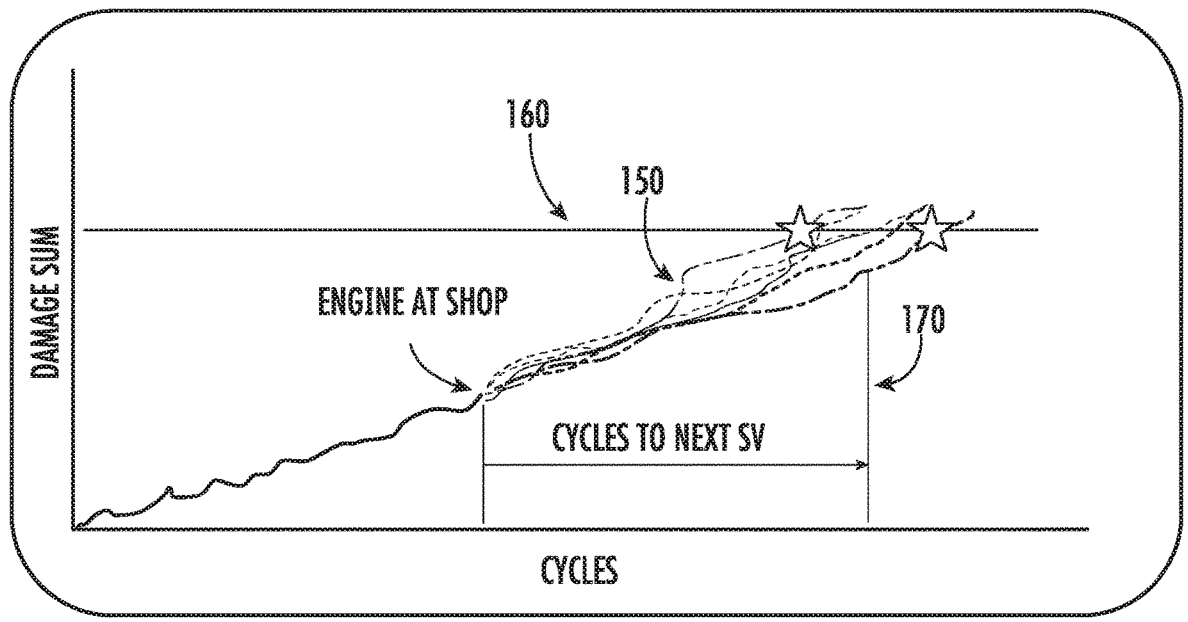
FIG. 11 provides a graph depicting damage sum associated with the engine of FIG. 2 as a function of operating cycles.

By way of example, FIG. 11 provides a graph depicting damage sum associated with the engine as a function of operating cycles. As depicted, the one or more processors of the system 100 have generated a set or a plurality of forecasts 150. The generated forecasts 150 are each functions that describe or represent a predicted damage sum associated with the engine as a function of operating cycle of the engine. In some embodiments, the generated forecasts 150 can be generated based only on the forecasted data 350 (FIG. 2). In other embodiments, the generated forecasts 150 can be generated based at least in part on the forecasted data 350 and the fleet forecasted data 380 (FIG. 2).

The cumulative damage model 140 defines a predetermined threshold 160 to which the forecasts 150 are compared relative to a known or predetermined next shop visit, represented as the vertical line 170 at one of the operating cycles of the engine. Particularly, the one or more processors of the system 100 can determine how many of the forecasts 150 exceed the predetermined threshold 160 prior to the next scheduled service visit 170 (i.e., how many of the forecasts 150 exceed the predetermined threshold 160 left of the next scheduled service visit 170). The one or more processors can also determine how many of the forecasts 150 do not exceed the predetermined threshold 160 prior to the next scheduled service visit 170.

At (408), returning to FIG. 3, the method (400) includes outputting, by the one or more computing devices, a cumulative probability distribution indicating a cumulative probability of the plurality of forecasts exceeding a predetermined threshold prior to a next scheduled service visit for the engine. For instance, based at least in part on the determinations noted above, in executing the cumulative damage model 140, the system 100 can output a cumulative probability distribution indicating a cumulative probability of the plurality of forecasts 150 exceeding the predetermined threshold 160 prior to the next scheduled service visit 170 for the engine.

Figure 12:
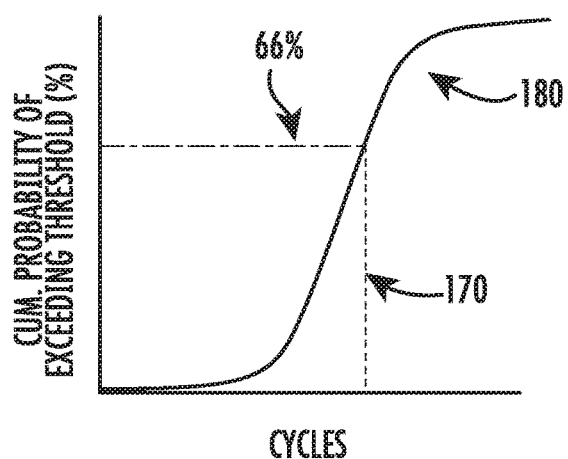
FIG. 12 provides an example output of the cumulative damage model of the system of FIG. 2.

FIG. 12 provides an example output of the cumulative damage model 140 of FIG. 2. As depicted, the output is a cumulative probability distribution. The cumulative probability distribution indicates a cumulative probability 180 of the forecasts 150 (FIG. 11) exceeding the predetermined threshold 160 (FIG. 11) prior to the next scheduled service visit 170 for the engine. In FIG. 12, the cumulative probability 180 is shown as a function of operating cycle. In this example, the cumulative probability 180 of the forecasts 150 of FIG. 11 exceeding the predetermined threshold 160 (FIG. 11) prior to the next scheduled service visit 170 for the engine is 66%. An operator or a maintenance system in communication with the system 100 (FIG. 2) can note the 66% probability and can schedule work scope accordingly, for example. In some implementations, the maintenance system can automatically schedule work scope activities based on the probability. The maintenance system can schedule service activities for the next service visit or can allow certain components to run until the next service visit.

Notably, the cumulative probability distribution may provide operators and/or automated systems with more accurate predictions as to the health of an engine generally or one or more components thereof, namely due to the use of the forecasted data points to generate the forecasts instead of linearly extrapolating the present damage sum of the engine into the future as has been done conventionally. The probability distribution may provide more insight into how close the engine or components thereof are to the predetermined threshold 160 that, when exceeded, may trigger a service action. In this regard, the output probability distribution may allow for more intelligent maintenance/service decisions to be made. Generally, the higher the probability of exceeding the predetermined threshold 160, the more likely an immediate service action is scheduled and performed. In contrast, the lower the probability of exceeding the predetermined threshold 160, the more likely a service action is to be held in abeyance until a later time.

The system and methods described herein provide a number of technical effects and commercial benefits and advantages. For instance, the methodology of forecasting data points for operational parameters described herein can ensure that correlations between parameters are carried forward and used in generating the forecasts used to ultimately determine the cumulative probability distribution. Moreover, the methodology provided herein can ensure that generated predictions have or are based on the explicitly defined uncertainty in the captured engine data. Further, the disclosed methodology captures key sources of variation in historical engine data and accounts for this variation in the generated forecasted data points. These forecasted data points can be input into various models, and due to the accuracy of the forecasted data points, more accurate estimates and predictions can be made. For instance, forecasted data points generated using the methodology herein can improve engine service work scoping, among other benefits. The methodology provided herein can also be scaled and/or used to model specific components of an engine, such as a compressor. The systems and methods provided herein can also enable improved analytics-based work scoping for aviation gas turbine engines, specific components thereof, or other assets. For instance, the systems and methods provided herein can enable probabilistic assessments of components of an engine that can be combined such that a module health expectation can be determined for certain modules of the engine, which may reduce the exposure rate of such modules. Moreover, the systems and methods provided herein can account for varying mission segment usage.

Further, the systems and methods provided herein can be utilized for a number of use cases. As one example use case, the systems and methods provided herein can be used to forecast engine behavior of an engine that is presently mounted to a tail/vehicle to predict how the engine and/or components thereof will behave during future operating cycles. As another example use case, the systems and methods provided herein can be used to forecast engine behavior of an engine mounted to or to be mounted on a second tail/second vehicle based on its usage on a first tail/first vehicle. As yet another example use case, particularly where the tail/vehicle to which an engine is or is to be mounted is known, the systems and methods provided herein can be used to forecast the engine behavior of the engine mounted to or to be mounted to the known tail/vehicle based on the behavior of previous ESNs or engines mounted to the known tail/vehicle. In such use cases, one or more of the plurality of forecasts 150 (FIG. 11) can be forecasts determined based on the engine behavior of previous ESNs or engines that were mounted to the known tail/vehicle. Such forecasts can be determined in accordance with the exemplary regression techniques described herein.

As a further example use case, particularly where a set of possible tails/vehicles to which an engine is to be mounted is known, the systems and methods provided herein can be used to forecast the engine behavior of the engine to be mounted by combining the behavior of previous engines or ESNs on that set of tails/vehicles. As yet a further example use case, particularly where no information is known about the tail/vehicle to which an engine is to be mounted is known, the systems and methods provided herein can be used to forecast the engine behavior of the engine to be mounted by combining the behavior of all of the engine/tail combinations, e.g., in a fleet to which the engine is a part.

Although the inventive concepts of the present disclosure have been disclosed primarily with respect to systems and methods for forecasting aircraft engine operational data, e.g., for use with predictive analytics, it will be appreciated that the inventive concepts disclosed herein can apply to other assets or applications and can be used in a wide variety of industries. For instance, the systems and methods disclosed herein can be used to forecast operational data of other assets, such as any suitable machine, device, system, etc. for which predictive analytics is beneficial. As one example, the asset can be the landing gear of an aircraft. As another example, the asset can be the main rotor of a rotary aircraft. As yet another example, the asset can be a drill bit of a drillstring for oil and gas exploration. As a further example, the asset can be a marine gas turbine engine. As another example, the asset can be a land-based power generation gas turbine engine or steam turbine engine. As yet another example, the asset can be a wind turbine. As another example, the asset can be an electric machine. These examples are not intended to be limiting; other examples are contemplated.

Accordingly, in one example aspect, a method is provided. The method includes receiving, by one or more computing devices, operational data associated with an asset. The asset can be any of the example assets provided above, for example. The operational data can include data points for one or more operational parameters. Each of the data points can be defined in part by a value associated with one of the operational parameters. The data points can also be defined by an instance, such as an operating cycle. The method can include determining, by the one or more computing devices, forecasted data points for each of the operational parameters. The forecasted data points for a given one of the operational parameters can be determined by applying one or more regression techniques to the data points associated with the given one of the operational parameters, e.g., in a manner described herein. Each of the forecasted data points can be defined in part by a forecasted value associated with one of the operational parameters. The method can also include generating, by the one or more computing devices, a plurality of forecasts based at least in part on the forecasted data points. The plurality of forecasts can each predict a damage sum associated with the asset. The method can also include outputting, by the one or more computing devices, a cumulative probability distribution indicating a cumulative probability of the plurality of forecasts exceeding a predetermined threshold prior to a next scheduled service visit for the asset.

In another example aspect, a system that includes one or more processors and one or more memory devices (e.g., one or more non-transitory computer-readable medium) can implement the method above. For instance, the one or more processors can be configured to: receive data associated with an asset. The asset can be any of the example assets noted above, for example. The data includes data points for operational parameters. Each of the data points can be defined in part by a value associated with one of the operational parameters. The one or more processors are further configured to determine forecasted data points for each of the operational parameters. The forecasted data points for a given one of the operational parameters can be determined by applying one or more regression techniques to the data points associated with the given one of the operational parameters. Any of the techniques disclosed herein can be utilized. Each of the forecasted data points can be defined in part by a forecasted value associated with one of the operational parameters. Further, the one or more processors are configured to generate a plurality of forecasts based at least in part on the forecasted data points, the plurality of forecasts each predicting a damage sum associated with the asset. The one or more processors are also configured to output a cumulative probability distribution indicating a cumulative probability of the plurality of forecasts exceeding a predetermined threshold prior to a next scheduled service visit for the asset.

In another example aspect, a method is provided. The method includes receiving, by one or more computing devices, data associated with an asset. The data can be operational data. The asset can be any of the example assets noted above, for example. The engine data includes data points each defined in part by a value associated with an operational parameter. The method also includes determining, by the one or more computing devices, forecasted data points associated with the operational parameter, each of the forecasted data points being defined in part by a forecasted value associated with the operational parameter. A given one of the forecasted data points is determined by: generating, by the one or more computing devices, a preliminary regression line relative to the data points; filtering out, by the one or more computing devices, outlier data points from the data points to render filtered data points, the outlier data points being filtered out based at least in part on a position of a given data point of the data points relative to the preliminary regression line; generating, by the one or more computing devices, a final regression line relative to the filtered data points; generating, by the one or more computing devices, a set of coefficients for a forecasting function based at least in part on the final regression line; generating, by the one or more computing devices, a forecasted regression line based at least in part on the forecasting function and the set of coefficients; selecting, by the one or more computing devices, a residual from a residual table, the residual defining a distance between a data point of the data points and the preliminary regression line, and wherein the given one of the forecasted data points is determined, by the one or more computing devices, based at least in part on the residual selected from the residual table and the forecasted regression line. In another example aspect, a system that includes one or more processors and one or more memory devices (e.g., one or more non-transitory computer-readable medium) can implement the method above.

FIG. 13 provides a block diagram of an example computing system 600 that can be used to implement methods and systems described herein according to example embodiments of the present subject. The computing system 600 is one example of a suitable computing system for implementing the computing elements described herein. The system 100 disclosed herein can be constructed and operate in a similar manner as the computing system 600.

As shown in FIG. 13, the computing system 600 can include one more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable medium, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable instructions 608 that can be executed by the one or more processor(s) 604. The instructions 608 can be any set of instructions that, when executed by the one or more processor(s) 604, cause the one or more processor(s) 604 to perform operations. The instructions 608 can be software written in any suitable programming language or can be implemented in hardware. The instructions 608 can be any of the computer-readable instructions noted herein.

The memory device(s) 606 can further store data 610 that can be accessed by the processor(s) 604. For example, the data 610 can include received engine data, received engine fleet data, etc. The data 610 can include one or more table(s), function(s), algorithm(s), model(s), equation(s), etc. according to example embodiments of the present disclosure.

The one or more computing device(s) 602 can also include a communication interface 612 used to communicate, for example, with other components of the system 100 or other systems or devices. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method, comprising: receiving, by one or more computing devices, engine data associated with an engine, the engine data including data points for operational parameters, each of the data points being defined in part by a value associated with one of the operational parameters; determining, by the one or more computing devices, forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters; generating, by the one or more computing devices, a plurality of forecasts based at least in part on the forecasted data points, the plurality of forecasts each predicting a damage sum associated with the engine; and outputting, by the one or more computing devices, a cumulative probability distribution indicating a cumulative probability of the plurality of forecasts exceeding a predetermined threshold prior to a next scheduled service visit for the engine.

2. The method of any preceding clause, wherein determining the forecasted data points for a given one of the operational parameters comprises: generating, by the one or more computing devices, a preliminary regression line by applying the one or more regression techniques to the data points associated with the given one of the operational parameters.

3. The method of any preceding clause, further comprising: filtering out, by the one or more computing devices, outlier data points from the data points associated with the given one of the operational parameters to render filtered data points, wherein the outlier data points are filtered out based at least in part on a position of a given data point of the data points associated with the given one of the operational parameters relative to the preliminary regression line.

4. The method of any preceding clause, further comprising: generating, by the one or more computing devices, a final regression line by applying the one or more regression techniques to the filtered data points.

5. The method of any preceding clause, further comprising: generating, by the one or more computing devices, a set of coefficients for a forecasting function associated with the given one of the operational parameters based at least in part on the final regression line.

6. The method of any preceding clause, wherein the set of coefficients includes a deterioration coefficient that indicates a slope of a deterioration line that best fits the final regression line.

7. The method of any preceding clause, wherein the set of coefficients includes a seasonal variation coefficient that indicates an amplitude of the final regression line.

8. The method of any preceding clause, further comprising: generating, by the one or more computing devices, a forecasted regression line based at least in part on the forecasting function and the set of coefficients.

9. The method of any preceding clause, further comprising: generating, by the one or more computing devices, a residual table, the residual table including a plurality of residuals generated for each of the operational parameters, each of the plurality of residuals being associated with a given one of the operational parameters and one of the operating cycles of the engine.

10. The method of any preceding clause, wherein determining a given one of the forecasted data points for the given one of the operational parameters comprises: selecting, by the one or more computing devices, a residual from the residual table, the residual defining a distance between one of the data points associated with the given one of the operational parameters and the preliminary regression line, and wherein the given one of the forecasted data points is determined, by the one or more computing devices, based at least in part on the residual selected from the residual table and the forecasted regression line.

11. The method of any preceding clause, wherein the residual is randomly selected from the residual table.

12. The method of any preceding clause, wherein in determining the forecasted data points for the operational parameters, the residuals used to generate the forecasted data points for each of the operational parameters for a given future operating cycle are all selected from the residual table that corresponds to residuals associated with or derived from a same operating cycle of the engine.

13. The method of any preceding clause, wherein the engine is an aviation gas turbine engine.

14. A method, comprising: receiving, by one or more computing devices, engine data associated with an engine, the engine data including data points each defined in part by a value associated with an operational parameter; determining, by the one or more computing devices, forecasted data points associated with the operational parameter, each of the forecasted data points being defined in part by a forecasted value associated with the operational parameter, and wherein a given one of the forecasted data points is determined by: generating, by the one or more computing devices, a preliminary regression line relative to the data points; filtering out, by the one or more computing devices, outlier data points from the data points to render filtered data points, the outlier data points being filtered out based at least in part on a position of a given data point of the data points relative to the preliminary regression line; generating, by the one or more computing devices, a final regression line relative to the filtered data points; generating, by the one or more computing devices, a set of coefficients for a forecasting function based at least in part on the final regression line; generating, by the one or more computing devices, a forecasted regression line based at least in part on the forecasting function and the set of coefficients; selecting, by the one or more computing devices, a residual from a residual table, the residual defining a distance between a data point of the data points and the preliminary regression line, and wherein the given one of the forecasted data points is determined, by the one or more computing devices, based at least in part on the residual selected from the residual table and the forecasted regression line.

15. The method of any preceding clause, wherein the residual is randomly selected from the residual table.

16. The method of any preceding clause, further comprising: generating, by the one or more computing devices, the residual table, the residual table including a plurality of residuals associated with the first operational parameter, the residual being selected from among the plurality of residuals, and wherein each of the plurality of residuals define a distance between a data point of the data points and the preliminary regression line for a given operating cycle of the engine.

17. The method of any preceding clause, wherein the engine data includes data points each defined in part by a value associated with a second operational parameter, and wherein the method further comprises: determining, by the one or more computing devices, forecasted data points associated with the second operational parameter, each of the forecasted data points associated with the second operational parameter being defined in part by a forecasted value associated with the second operational parameter, and wherein a given one of the forecasted data points associated with the second operational parameter is determined by: generating, by the one or more computing devices, a second preliminary regression line relative to the data points associated with the second operational parameter; filtering out, by the one or more computing devices, outlier data points from the data points associated with the second operational parameter to render second filtered data points, the outlier data points associated with the second operational parameters being filtered out based at least in part on a position of a given data point of the data points associated with the second operational parameter relative to the second preliminary regression line; generating, by the one or more computing devices, a second final regression line relative to the second filtered data points; generating, by the one or more computing devices, a second set of coefficients for a second forecasting function based at least in part on the second final regression line; generating, by the one or more computing devices, a second forecasted regression line based at least in part on the second forecasting function and the second set of coefficients; and selecting, by the one or more computing devices, a second residual from the residual table, the second residual defining a distance between a data point of the data points associated with the second data points and the second preliminary regression line, and wherein the second residual selected from the residual table is derived from a same operating cycle of the engine from which the residual is derived.

18. The method of any preceding clause, wherein the given one of the forecasted data points associated with the second operational parameter is determined, by the one or more computing devices, based at least in part on the second residual selected from the residual table and the second forecasted regression line.

19. The method of any preceding clause, further comprising: generating, by the one or more computing devices, a plurality of forecasts based at least in part on the forecasted data points, the plurality of forecasts each predicting a damage sum associated with the engine; and outputting, by the one or more computing devices, a cumulative probability distribution indicating a cumulative probability of the plurality of forecasts exceeding a predetermined threshold prior to a next scheduled service visit for the engine.

20. A system, comprising: one or more memory devices; one or more processors, the one or more processors being configured to: receive data associated with an asset, the data including data points for operational parameters, each of the data points being defined in part by a value associated with one of the operational parameters; determine forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters; generate a plurality of forecasts based at least in part on the forecasted data points, the plurality of forecasts each predicting a damage sum associated with the asset; and output a cumulative probability distribution indicating a cumulative probability of the plurality of forecasts exceeding a predetermined threshold prior to a next scheduled service visit for the asset.

What is claimed is:

1. A method, comprising:
receiving, by one or more computing devices, engine data associated with an engine, the engine data including data points for operational parameters, each of the data points being defined in part by a value associated with one of the operational parameters;
determining, by the one or more computing devices, forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters;
generating, by the one or more computing devices, a plurality of forecasts based at least in part on the forecasted data points, the plurality of forecasts each predicting a damage sum associated with the engine; and
outputting, by the one or more computing devices, a cumulative probability distribution indicating a cumulative probability of the plurality of forecasts exceeding a predetermined threshold prior to a next scheduled service visit for the engine.

2. The method of claim 1, wherein determining the forecasted data points for a given one of the operational parameters comprises:

generating, by the one or more computing devices, a preliminary regression line by applying the one or more regression techniques to the data points associated with the given one of the operational parameters.

3. The method of claim 2, further comprising:

filtering out, by the one or more computing devices, outlier data points from the data points associated with the given one of the operational parameters to render filtered data points, wherein the outlier data points are filtered out based at least in part on a position of a given data point of the data points associated with the given one of the operational parameters relative to the preliminary regression line.

4. The method of claim 3, further comprising:

generating, by the one or more computing devices, a final regression line by applying the one or more regression techniques to the filtered data points.

5. The method of claim 4, further comprising:

generating, by the one or more computing devices, a set of coefficients for a forecasting function associated with the given one of the operational parameters based at least in part on the final regression line.

6. The method of claim 5, wherein the set of coefficients includes a deterioration coefficient that indicates a slope of a deterioration line that best fits the final regression line.

7. The method of claim 5, wherein the set of coefficients includes a seasonal variation coefficient that indicates an amplitude of the final regression line.

8. The method of claim 5, further comprising:

generating, by the one or more computing devices, a forecasted regression line based at least in part on the forecasting function and the set of coefficients.

9. The method of claim 8, further comprising:

generating, by the one or more computing devices, a residual table, the residual table including a plurality of residuals generated for each of the operational parameters, each of the plurality of residuals being associated with a given one of the operational parameters and one of the operating cycles of the engine.

10. The method of claim 9, wherein determining a given one of the forecasted data points for the given one of the operational parameters comprises:

selecting, by the one or more computing devices, a residual from the residual table, the residual defining a distance between one of the data points associated with the given one of the operational parameters and the preliminary regression line, and wherein the given one of the forecasted data points is determined, by the one or more computing devices, based at least in part on the residual selected from the residual table and the forecasted regression line.

11. The method of claim 10, wherein the residual is randomly selected from the residual table.

12. The method of claim 11, wherein in determining the forecasted data points for the operational parameters, the residuals used to generate the forecasted data points for each of the operational parameters for a given future operating cycle are all selected from the residual table that corresponds to residuals associated with or derived from a same operating cycle of the engine.

13. The method of claim 1, wherein the engine is an aviation gas turbine engine.

14. A method, comprising:

receiving, by one or more computing devices, engine data associated with an engine, the engine data including data points each defined in part by a value associated with an operational parameter;

determining, by the one or more computing devices, forecasted data points associated with the operational parameter, each of the forecasted data points being defined in part by a forecasted value associated with the operational parameter, and wherein a given one of the forecasted data points is determined by:

generating, by the one or more computing devices, a preliminary regression line relative to the data points;

filtering out, by the one or more computing devices, outlier data points from the data points to render filtered data points, the outlier data points being filtered out based at least in part on a position of a given data point of the data points relative to the preliminary regression line;

generating, by the one or more computing devices, a final regression line relative to the filtered data points;

generating, by the one or more computing devices, a set of coefficients for a forecasting function based at least in part on the final regression line;

generating, by the one or more computing devices, a forecasted regression line based at least in part on the forecasting function and the set of coefficients;

selecting, by the one or more computing devices, a residual from a residual table, the residual defining a distance between a data point of the data points and the preliminary regression line, and wherein the given one of the forecasted data points is determined, by the one or more computing devices, based at least in part on the residual selected from the residual table and the forecasted regression line.

15. The method of claim 14, wherein the residual is randomly selected from the residual table.

16. The method of claim 14, further comprising:

generating, by the one or more computing devices, the residual table, the residual table including a plurality of residuals associated with the first operational parameter, the residual being selected from among the plurality of residuals, and wherein each of the plurality of residuals define a distance between a data point of the data points and the preliminary regression line for a given operating cycle of the engine.

17. The method of claim 14, wherein the engine data includes data points each defined in part by a value associated with a second operational parameter, and wherein the method further comprises:

determining, by the one or more computing devices, forecasted data points associated with the second operational parameter, each of the forecasted data points associated with the second operational parameter being defined in part by a forecasted value associated with the second operational parameter, and wherein a given one of the forecasted data points associated with the second operational parameter is determined by:

generating, by the one or more computing devices, a second preliminary regression line relative to the data points associated with the second operational parameter;

filtering out, by the one or more computing devices, outlier data points from the data points associated with the second operational parameter to render second filtered data points, the outlier data points associated with the second operational parameters being filtered out based at least in part on a position of a given data point of the data points associated with the second operational parameter relative to the second preliminary regression line;

generating, by the one or more computing devices, a second final regression line relative to the second filtered data points;

generating, by the one or more computing devices, a second set of coefficients for a second forecasting function based at least in part on the second final regression line;

generating, by the one or more computing devices, a second forecasted regression line based at least in part on the second forecasting function and the second set of coefficients; and selecting, by the one or more computing devices, a second residual from the residual table, the second residual defining a distance between a data point of the data points associated with the second data points and the second preliminary regression line, and wherein the second residual selected from the residual table is derived from a same operating cycle of the engine from which the residual is derived.

18. The method of claim 17, wherein the given one of the forecasted data points associated with the second operational parameter is determined, by the one or more computing devices, based at least in part on the second residual selected from the residual table and the second forecasted regression line.

19. The method of claim 14, further comprising:

generating, by the one or more computing devices, a plurality of forecasts based at least in part on the forecasted data points, the plurality of forecasts each predicting a damage sum associated with the engine; and outputting, by the one or more computing devices, a cumulative probability distribution indicating a cumulative probability of the plurality of forecasts exceeding a predetermined threshold prior to a next scheduled service visit for the engine.

20. A system, comprising:

one or more memory devices;

one or more processors, the one or more processors being configured to:

receive data associated with an asset, the data including data points for operational parameters, each of the data points being defined in part by a value associated with one of the operational parameters;

determine forecasted data points for each of the operational parameters, the forecasted data points for a given one of the operational parameters being determined by applying one or more regression techniques to the data points associated with the given one of the operational parameters, each of the forecasted data points being defined in part by a forecasted value associated with one of the operational parameters;

generate a plurality of forecasts based at least in part on the forecasted data points, the plurality of forecasts each predicting a damage sum associated with the asset; and output a cumulative probability distribution indicating a cumulative probability of the plurality of forecasts exceeding a predetermined threshold prior to a next scheduled service visit for the asset.

* * * * *